Figure 1:
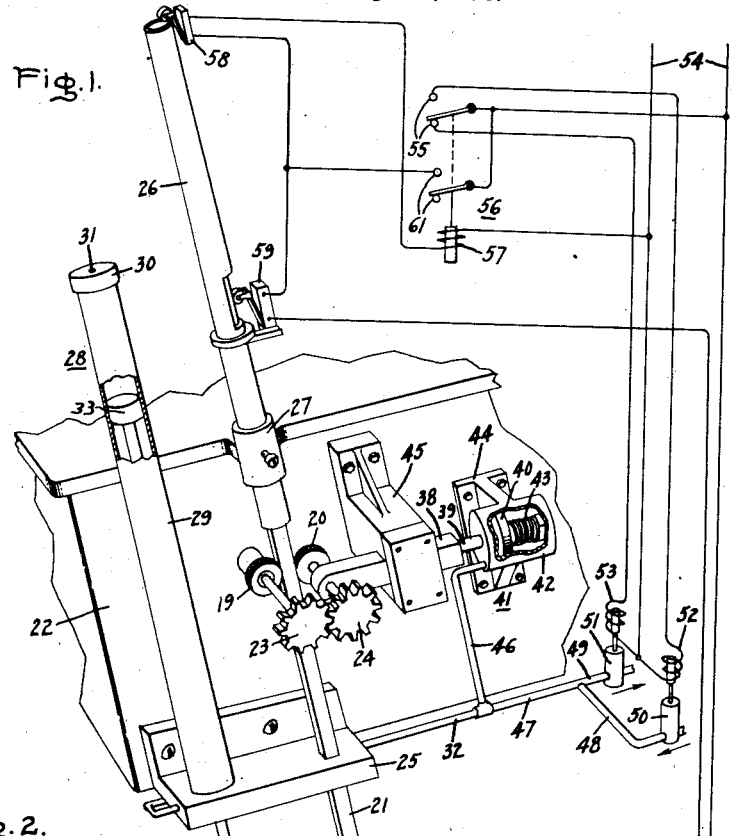

Aug. 25, 1942.  V. E. MANN  2,294,312
AUTOMATIC ARC WELDING APPARATUS AND CONTROL THEREFOR
Filed Aug. 24, 1940

Switch closed at end of each welding operation.

Inventor:
Vernon E. Mann,
by Harry E. Dunham
His Attorney.

Patented Aug. 25, 1942

2,294,312

UNITED STATES PATENT OFFICE 2,294,312

AUTOMATIC ARC WELDING APPARATUS AND CONTROL THEREFOR

Vernon E. Mann, Scotia, N. Y., assignor to General Electric Company, a corporation of New York Application August 24, 1940, Serial No. 354,129

7 Claims. (Cl. 219—8)

My invention relates to automatic arc welding apparatus and more particularly to apparatus suitable for feeding short length or stick electrodes. It also relates to a limit switch control associated therewith.

Electrodes having a heavy coating of flux are extensively used for hand welding operations. These electrodes are furnished to the trade in uniform, standard, short lengths having one end bared of flux for insertion in an electrode holder by means of which welding current is supplied thereto. These electrodes are frequently referred to as stick electrodes. Automatic arc welding machines have been devised for feeding these electrodes in order to avoid the complications resulting from providing means for supplying welding current through the flux coatings of electrodes of indefinite length which are furnished to the trade in coils or on reels. Such automatic machines also avoid the use of heavy coated electrodes of special types which have heretofore been proposed for use in automatic arc welding machines and, consequently, make it possible to use in an automatic machine the same supply of stick electrodes that are used for hand welding operations.

Where the same welding operation is repeated, any arrangement which enables the welding operator quickly to insert a new standard length electrode in the machine or which increases the total time available for welding is of considerable value to the manufacturer in that it enables a greater production within a limited period of time. It is also of great value to remove from the judgment of an operator his estimation of whether the remaining portion of a partially consumed electrode is of sufficient length to complete another welding operation before reloading the machine with a new electrode.

It is an object of my invention to provide an automatic arc welding machine or an attachment for lightly coated or bare wire automatic arc welding heads by which these desired results are obtained.

It is also an object of my invention to provide an automatic arc welding machine of the stick feeding type in which the loading position of the electrode is such that a new electrode may be properly inserted therein without requiring the careful attention of the welding operator.

It is a further object of my invention to provide an automatic arc welding machine of the stick feeding type in which the electrode holder is returned to a loading position which is not only spaced from the work a predetermined distance such that a new electrode is properly positioned therein when its end rests upon the work but which is also spaced from the electrode feeding means a sufficient distance for travel of the holder away from the work for arc striking purposes under control of this electrode feeding means. This decreases the total welding time in that it is only necessary to withdraw the electrode from the work to strike the welding arc.

It is another object of my invention to provide an automatic arc welding machine of the stick feeding type in which a limit switch control which is responsive to the position of the electrode holder and the position of the work after each welding operation is employed for returning the electrode holder to its loading position when the amount of unconsumed electrode is insufficient for another welding operation. Certain welding operations must be completed by one uninterrupted line of welding in order to avoid porosity where welds from two different electrodes join or to insure a desired appearance of the weld by avoiding unsightly overlaps.

Further objects of my invention will become apparent from a consideration of embodiments thereof.

Figure 2:
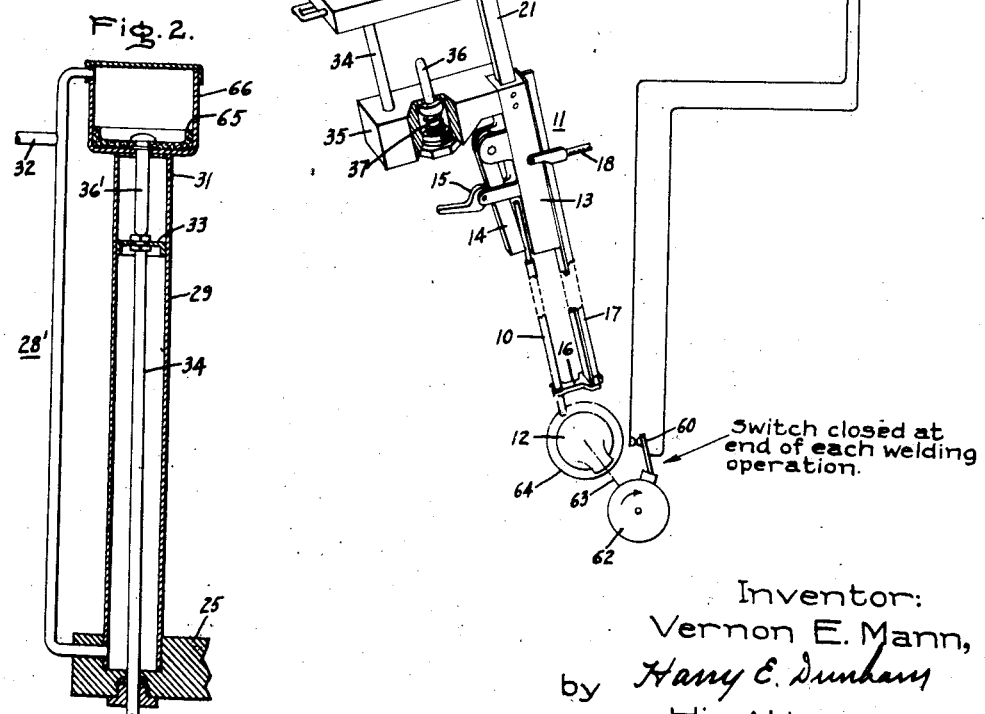

In the drawing Fig. 1 is a diagrammatic view illustrating one embodiment of my invention and Fig. 2 is a sectional view illustrating a fluid operated stop which may be associated with the mechanism for returning the electrode holder to its loading position as a substitute for the stop and spring biased plunger shown in Fig. 1.

In the arrangement illustrated in Fig. 1, an electrode holder and the standard length electrode therein are fed away from and toward the work to strike and maintain a welding arc by means of an electrode feeding means which is adapted to engage a feed rod attached to and forming a part of the holder. The connection between the electrode feeding means and the feed rod of the holder is controlled by a fluid operated means. Fluid operated means are also provided for returning the electrode holder to its loading position. These fluid operated means are controlled in response to the position of the electrode holder and the position of the work after a welding operation to return the electrode holder to its welding position when, at the end of a welding operation, the consumption of an electrode in the holder exceeds a predetermined amount such that the portion of the partly consumed electrode remaining in the holder is insufficient for making the next weld. Both of these fluid operated means are energized and deenergized at the same time. When deenergized, the operating inertia of the fluid operated means which controls the connection between the electrode feeding means and the feed rod of the holder, permits a spring biased plunger located between the holder and a stop to position the holder from this stop against which it was moved by the other fluid operated means and thus locate it in its loading position. This loading position is so spaced from the work that a new standard length electrode is properly positioned in the holder when its arcing terminal rests upon the work and so spaced from the electrode feeding means that there is sufficient distance for travel of the holder away from the work for arc striking purposes under the control of the electrode feeding means.

In the modification shown in Fig. 2, the return movement of the electrode holder is arrested by a fluid operated stop which when deenergized releases the electrode holder for further movement away from the work for arc striking purposes under the control of the electrode feeding means associated therewith.

In the arrangement shown in Fig. 1, the bared end portion of a standard length electrode 10 is properly positioned in an electrode holder 11 when its arcing end rests against the work 12. This electrode holder comprises a body portion 13 against which the electrode is held by a movable jaw 14 pivotally attached thereto and forced into engagement with the electrode by a cam latch 15 mounted on the body portion of the holder. The lower end of electrode 10 is properly positioned relatively to the work by a guide 16 which is mounted on the holder by a member 17. Welding current is supplied to the holder through a conductor 18 which is attached to the body 13 thereof.

The electrode holder and the electrode therein is fed away from and toward the work by a pair of feed rolls 19 and 20 which are adapted to engage a feed rod 21 forming part of the holder. Feed roll 19 is positively driven by a feed motor forming part of the welding head through a suitable transmission within the housing 22 also forming part of the welding head. The welding head may have the construction more fully illustrated in United States Letters Patent 2,024,965, Verni J. Chapman, granted December 17, 1935, and assigned to the assignee of this invention. The speed and direction of rotation of the feed motor of the welding head and consequently the speed and direction of rotation of feed roll 19 may be controlled through the agency of any suitable arc responsive system such as shown in United States Letters Patent 1,701,372, Frank M. Jefts, granted February 5, 1929, or United States Letters Patent 2,175,017, William D. Cockrell, granted October 3, 1939, both of which are assigned to the assignee of this invention. As shown in Fig. 1, feed roll 20 is positively driven by feed roll 19 through intermeshing gears 23 and 24.

Feed rod 21 of the electrode holder passes through and is guided by a support member 25 which is attached to the housing 22 of the welding head. The upper end of this feed rod is enclosed within a guide tube 26 whose lower end is mounted in a holder 27 forming part of the housing 22 of the welding head.

The electrode holder is returned from the position it assumes due to electrode consumption to a loading position for a new electrode through the agency of a fluid operated means 28. This fluid operated means comprises a cylinder 29 the lower end of which is mounted on and is closed by support member 25 and the upper end of which is closed by a cap 30 having a vent 31 therein. Fluid such as air is supplied and exhausted from the lower end of this cylinder through a conduit 32 which passes through support 25 into the lower portion of cylinder 29. A piston 33 located within cylinder 29 is connected by a piston rod 34 to an arm 35 forming part of electrode holder 11. A suitable packing is provided between this piston rod and support 25 to prevent escape of the pressure fluid supplied to cylinder 29 through conduit 32.

When fluid under pressure is supplied to cylinder 29, piston 33 and electrode holder 11 are moved away from the work until the holder engages support 25 on the welding head. This support, consequently, functions as a stop in the path of travel of the electrode holder. When an exhaust connection is completed from cylinder 29 through conduit 32, the electrode holder is moved a predetermined distance away from support 25 by a plunger 36 which is mounted in arm 35 of the holder and biased by a spring 37 to the position illustrated. This spring biased plunger locates the electrode holder relative to the welding head in its loading position which is not only spaced from the work a predetermined distance such that a new standard length electrode is properly positioned therein when its end rests upon the work but which is also spaced from the welding head a sufficient distance for travel of the holder away from the work for arc striking purposes under the control of feed rolls 19 and 20 of the welding head.

Feed roll 20, its driving gear 24 and the axle connecting them, are mounted in one end of a block 38 whose other end is connected by a piston rod 39 to a piston 40 forming part of a fluid operated means 41 which functions to move feed roll 20 into and out of driving engagement with feed rod 21 of the electrode holder. This piston is enclosed within a cylinder 42 and biased to the position illustrated by a spring 43 within the cylinder. This cylinder is mounted by a bracket 44 on housing 22 of the welding head. Block 38 is mounted for sliding movement in a bracket 45 also mounted on this housing. Fluid under pressure, such as air, is supplied to or exhausted from the side of piston 40 opposite spring 43 through a conduit 46. A packing between piston rod 39 and the end wall of cylinder 42 through which this piston rod extends prevents loss of pressure fluid between these members.

Conduits 32 and 46 are connected by a common conduit 47 which branches into conduits 48 and 49. Conduit 48 is connected through a valve 50 to a source of fluid pressure and conduit 49 is connected through a valve 51 for exhaust to atmosphere. The operation of valves 50 and 51 simultaneously establish pressure and exhaust connections for energizing and deenergizing fluid operated means 28 and 41. When fluid operated means 28 is energized, it moves the electrode holder away from the work into engagement with support 25 and when fluid operated means 41 is energized it moves the feed roll 20 out of engagement with feed rod 21 of the electrode holder. When these fluid operated means are deenergized, spring 43 of fluid operated means 41 again forces feed roll 20 into engagement with the feed rod of the holder. Due to the operating inertia of fluid operated means 41, a driving connection is not completed between the feed rolls and feed rod until after spring biased plunger 36 has moved the holder a predetermined distance from support 25 into its loading position. This loading position, as previously noted, is not only spaced from the work a predetermined distance such that a new electrode is properly positioned therein when its end rests upon the work, but is also spaced from the electrode feeding means a sufficient distance for travel of the holder away from the work for arc striking purposes under the control of this feeding means.

Valves 50 and 51 are of the electromagnetic type and are provided with operating windings 52 and 53. These windings are selectably connected across a source of supply 54 through contacts 55 of a relay 56. This relay is provided with an operating winding 57. The connection of this winding across the source of supply 54 is controlled by limit switches 58, 59 and 60. A holding circuit for this relay is established through limit switch 58 and contacts 61 of this relay.

Limit switches 58 and 59 are operated in response to predetermined positions of the electrode holder. They are mounted on tube 26 through which feed rod 21 of the holder passes. Limit switch 58 is mounted at the top of this tube and so positioned thereon that when holder 11 engages or is about to engage support 25, feed rod 21 operates it to open its normally closed contacts. Limit switch 59 is supported on the lower portion of tube 26, a part of which is cut away to expose feed rod 21 located therein. When this feed rod passes below limit switch 59, it closes its normally open contacts.

Limit switch 60 is responsive to the position of the work 12 after each welding operation. Its contacts are closed by a cam disc 62 after each welding operation has been completed. A connection 63 is provided between cam disc 62 and the work holder and traversing means 64. This connection is such that one complete revolution is imparted to cam disc 62 for each welding operation. Thus, if the weld on work 12 is lapped open itself a predetermined amount, connection 63 is such that cam disc 62 makes one complete revolution even though the work traversing means 64 makes more than one revolution. Furthermore, if a backward movement is imparted to the work traversing means 64 to position it for initiating the next welding operation at a predetermined point on the work supported thereby, a suitable mechanism such as a ratchet drive may be provided in connection 63 so that cam disc 62 is not also reversed with the reversal of work traversing means 64.

The work traversing means 63 may be a turntable for supporting the float valve chamber of a refrigerator. This turntable and its drive may have the physical structure described and claimed in United States Letters Patent 2,280,627, Verni J. Chapman, granted April 21, 1942, and assigned to the assignee of this invention. Any suitable traversing control may be provided for the work traversing means 64. A suitable control has been described and claimed in my application Serial No. 351,979, for Automatic arc welding systems, filed August 9, 1940, and assigned to the assignee of this invention.

The operation of the welding head and its structure above described is as follows:

In the drawing the electrode holder has not been illustrated in its loading position which would be determined by the action of spring biased plunger 36 and support 25. It has been moved away from this loading position toward the work in order to facilitate illustration of this plunger and its support in the electrode holder.

Assuming that the electrode holder is in its loading position, one end of a standard length stick electrode 10 is properly positioned therein when its other end rests upon the work 12. Consequently, the loading operation consists merely in placing one end of electrode 10 upon the work 12 and its other end in electrode holder 11 and then operating cam latch 15 to close the holder and clamp the electrode therein.

The welding operation is then initiated by operating a start button such as shown in the above referred to Letters Patent to Frank M. Jefts. The arc responsive control associated with the welding head will thereupon impart rotation to feed rolls 19 and 20 to move the electrode holder away from the work to strike an arc. The spacing of holder 11 from support 25 by spring biased plunger 36 makes possible this arc striking operation under the control of the electrode feeding means. After an arc has been established between the electrode and the work, feed rolls 19 and 20 of the welding head will thereafter move the electrode holder toward the work to compensate for the consumption of the electrode located therein and maintain an arc of predetermined voltage. When the welding operation has been completed, the operator may stop the welding operation by closing a stop switch such as shown in the above referred to Letters Patent to Frank M. Jefts. This stopping may, however, be made automatically by a travel control such as disclosed in my above referred to application.

If the electrode is of sufficient length to perform more than one welding operation, the operator initiates other welding operations until finally the end of feed rod 21 of the electrode holder passes beyond limit switch 59. Then at the end of a welding operation when limit switch 60 also closes, the operating winding of relay 56 is connected across the source of supply 54 through limit switches 60, 59 and 58. This relay consequently closes its contacts 61 and transfers the connection through its lower contacts 55 to its upper contacts 55. The connection established through contacts 61 completes through limit switch 58 a holding circuit for the operating winding 57 of relay 56. The closure of the upper pair of contacts 55 of relay 56 connects the operating winding 52 of valve 50 across the source of supply 54. Fluid pressure is consequently supplied to the fluid operated means 28 and 41.

Fluid operated means 41 disengages the connection between feed rolls 19 and 20 and feed rod 21 of the electrode holder and fluid operated means 28 moves this electrode holder away from the work until it engages support 25 which acts as a stop. Opening 31 in cap 30 of cylinder 29 of fluid operated means 28 cushions this return movement by limiting the rate at which air is exhausted from the upper end of the cylinder.

When or just prior to the time that the electrode holder engages stop 25, limit switch 58 is operated by the passage thereby of the end of feed rod 21. The consequent opening of the contacts of this limit switch deenergizes relay 56 which returns to the position illustrated in the drawing. In this position, this relay completes the connection of the operating winding 53 of exhaust valve 51 across the source of supply 54. The operation of this valve deenergizes the fluid operated means 28 and 41 by connecting them to exhaust. While the spring 43 forming part of the fluid operated means 41 is moving feed roll 20 into engagement with feed rod 21, spring biased plunger 36 moves the electrode holder to its loading position. The holder is consequently properly positioned for the insertion of a new electrode in the manner above described.

The return movement of the electrode holder may be arrested by a fluid operated stop such as shown in Fig. 2 in order properly to locate it in the desired loading position. This fluid operated stop will replace the spring biased plunger 36 of Fig. 1. It will be associated with the fluid operated means 28, corresponding parts of which have been indicated by corresponding reference numerals in Fig. 2 where the fluid operated means as a whole has been identified as 28'. As shown in Fig. 2, one end of this fluid operated stop 36' engages the piston 33 within cylinder 29 and its other end is connected to a piston 65 which is located within a cylinder 66 supported on the upper end of cylinder 29. Conduit 32 branches to supply fluid to the upper portion of cylinder 66 as well as to the lower portion of cylinder 29. Consequently, when fluid operated means 28' is energized, piston 33 is moved upward in cylinder 29 until it engages stop 36' which has been moved to the position illustrated in Fig. 2 by the supply of fluid to cylinder 66. It is to be noted that cylinder 66 is of larger diameter than cylinder 29, and consequently the total pressure on piston 65 will be greater than the total pressure on piston 33 so that when piston 33 engages stop 36', its upward movement is arrested thereby. When fluid operated means 28 is deenergized by connecting conduit 32 to exhaust, stop 36' will no longer prevent further upward movement of piston 33 and the electrode feeding mechanism may consequently function to move the electrode holder away from the work to strike the welding arc.

When using the fluid operated means 28' shown in Fig. 2 in place of the fluid operated means 28 of Fig. 1, it is, of course, apparent that limit switch 58 must be properly located on tube 26 so that it is operated by feed rod 21 when or just prior to the time that piston 33 engages stop 36'. Otherwise the substitution of fluid operated means 28' of Fig. 2 for fluid operated means 28 of Fig. 1 requires no other change in the arrangement of Fig. 1 above described.

In both the arrangements of Fig. 1 and Fig. 2 it may prove desirable to have conduit 32 of smaller size than conduit 46 so that fluid operated means 41 disengages feed rolls 19 and 20 from feed rod 21 before fluid operated means 28 operates to move the electrode holder and feed rod 21 away from the work. If this is not done, fluid operated means 28 may be stalled so that pressure is built up in its operating cylinder before feed rolls 19 and 20 disengage and release feed rod 21 resulting in a return movement of the electrode holder which is initiated with a jerk due to this built up pressure. Conduits 32 and 46 may be of the same size and a restriction or choke placed in conduit 32 to accomplish this result.

It will be noted that the apparatus above described is in the nature of an attachment which may be added to automatic arc welding heads which are adapted for feeding bare or lightly coated electrodes of indefinite length. It may, however, be an integral part of an automatic arc welding head which is suited solely for feeding stick electrodes. In either case, my invention is not limited in its application to the feeding of heavy coated stick electrodes but may be used for feeding any form of short length electrode.

Under some circumstances a more positive drive between the feed rolls and feed rod of the holder may be required. If so, a rack may be formed in or attached to the feed rod opposite feed roll 20 which will be provided with gear teeth that mesh with and drive the rack. Other forms of drive more positive than the friction drive above illustrated will occur to those skilled in the art to which my invention relates.

When the feed rod is provided with a rack, limit switches 58 and 59 may be repositioned on tube 26 so that they engage an even portion of the feed rod. By substituting elongated shoes for the rollers illustrated on the operating members of these limit switches, their position may be as illustrated since such shoes will not be affected by the irregularities of the feed rod resulting from the teeth of the rack.

It is, of course, apparent that many variations and modifications may be made of my invention without departing from its spirit and scope. Thus, while I have shown particular embodiments thereof, such modifications and variations are contemplated as fall within the true spirit and scope of my invention as defined in the appended claims.

What I claim as new and desire to secure by Letters Patent of the United States is:

1. Welding apparatus comprising an electrode holder, a welding head having feeding means for moving said electrode holder away from and toward the work to strike and maintain a welding arc of predetermined length between the work and a standard length electrode in said electrode holder, means for controlling the driving connection between said electrode holder and said feeding means of said welding head, means for moving said electrode holder away from the work to a loading position spaced from the end of its travel away from the work by a distance at least equal to the arc striking movement away from the work imparted thereto by said feeding means of said welding head, means for operating said controlling means and said moving means to disengage the driving connection between said electrode holder and said feeding means of said welding head, move said electrode holder to its said loading position and re-establish the driving connection between said electrode holder and said feeding means of said welding head, means for initiating the operation of said last mentioned means, and a work holder spaced from said welding head a distance such that one end of a standard length electrode is properly positioned in said electrode holder in its said loading position when the other end of said standard length electrode rests upon the work located in said work holder.

2. Welding apparatus comprising an electrode holder, a feed rod attached to said holder, electrode feeding means for moving said feed rod away from and toward the work to strike and maintain a welding arc between the work and an electrode in said holder, fluid operated means which when energized moves said holder away from the work, means including a stop and a spring biased plunger located between said holder and said stop for limiting the travel imparted to said holder by said fluid operated means and for spacing said holder from said stop a predetermined distance sufficient for arc striking movement after said fluid operated means has been deenergized, means for establishing a connection between said electrode feeding means and said feed rod, fluid operated means which when energized disengages the connection between said electrode feeding means and said feed rod and which after deenergization maintains said disengagement for an interval of time sufficient for said stop and said spring biased plunger to space said holder said predetermined distance, and fluid control means for energizing and deenergizing said fluid operated means.

3. Welding apparatus comprising an electrode holder, a feed rod attached to said holder, electrode feeding means for moving said feed rod away from and toward the work to strike and maintain a welding arc between the work and a standard length electrode in said holder, means for establishing a connection between said feed rod and said electrode feeding means, fluid operated means which when energized disengages the connection between said electrode feeding means and said feed rod, a second fluid operated means which when energized moves said holder away from the work, a third fluid operated means which when energized limits the travel imparted to said holder by said second fluid operated means and locates it in a loading position which is spaced from the work a predetermined distance such that a new electrode of the same standard length is properly positioned in said holder when its end rests upon the work and which when thus reloaded is also spaced from said electrode feeding means a sufficient distance for travel of said holder away from the work for arc striking purposes under the control of said feeding means, and means for energizing and deenergizing said fluid operated means.

4. Welding apparatus comprising an electrode holder, means for feeding said electrode holder toward and away from the work to strike and maintain a welding arc and for returning said electrode holder to a loading position, and means including a limit switch responsive to the spacing of said electrode holder from the work and a second limit switch responsive to the position of the work at the end of a welding operation for operating said last mentioned means to return said electrode holder to its loading position when at the end of a welding operation the consumption of an electrode in said electrode holder exceeds a predetermined amount.

5. Welding apparatus comprising an electrode holder, a feed rod attached to said holder, electrode feeding means for moving said feed rod away from and toward the work to strike and maintain a welding arc between the work and an electrode in said holder, means for establishing a connection between said feed rod and said electrode feeding means, fluid operated means which when energized disengages the connection between said electrode feeding means and said feed rod, fluid operated means which when energized moves said holder a predetermined distance away from the work, electrically operated valve means for controlling the pressure and exhaust connections and consequently the energization and deenergization of said fluid operated means, means including a limit switch responsive to a predetermined travel of said holder toward the work and a limit switch responsive to the position of the work at the end of a welding operation for operating said valve controlling means to energize said fluid operated means, and means including a limit switch responsive to a predetermined travel of said holder away from the work for operating said valve controlling means to deenergize said fluid operated means.

6. Welding apparatus comprising an electrode holder, a feed rod attached to said holder, electrode feeding means for moving said feed rod away from and toward the work to strike and maintain a welding arc between the work and a standard length electrode in said holder, fluid operated means for controlling the connection between said electrode feeding means and said feed rod, fluid operated means for returning said holder from the position it assumes after a welding operation due to electrode consumption to a loading position which is spaced from the work a predetermined distance such that a new electrode of the same standard length is properly positioned therein when its end rests upon the work and which when thus reloaded is also spaced from said electrode feeding means a sufficient distance for travel of said holder away from the work for arc striking purposes under the control of said electrode feeding means, and means including a limit switch responsive to a predetermined travel of said holder toward the work, a limit switch responsive to a predetermined travel of said holder away from the work and a limit switch responsive to the position of the work at the end of a welding operation for controlling the supply of pressure fluid to said fluid operated means to return said holder to its loading position and disengage the connection between said electrode feeding means and said feed rod during the return of said holder to its loading position.

7. Welding apparatus comprising means for clamping one end of a stick electrode, a feed rod attached to said clamping means, electrode feeding means for moving said feed rod away from and toward the work to strike and maintain a welding arc between the other end of said electrode and the work, means for establishing a connection between said feed rod and said electrode feeding means, fluid operated means which when energized disengages the connection between said electrode feeding means and said feed rod, fluid operated means which when energized moves said clamping means away from the work, fluid operated means which when energized limits the travel imparted to said clamping means by said fluid operated means and positions said clamping means in a loading position which is spaced from the work a predetermined distance such that one end of a new electrode is properly positioned therein when its other end rests upon the work and which is also spaced from said electrode feeding means a sufficient distance for travel of said clamping means away from the work for arc striking purposes under the control of said feeding means, electrically operated valve means for controlling the pressure and exhaust connections and consequently the energization and deenergization of said fluid operated means, means including a limit switch responsive to a predetermined travel of said clamping means toward the work and a limit switch responsive to the position of the work at the end of a welding operation for operating said valve controlling means to energize said fluid operated means, and means including a limit switch responsive to a predetermined travel of said clamping means away from the work for operating said valve controlling means to deenergize said fluid operated means.

VERNON E. MANN.